(12) United States Patent
Tulsidas

(10) Patent No.: US 12,737,636 B2
(45) Date of Patent: Sep. 15, 2026

(54) AUTONOMOUS AI PROCESS THROUGH REINFORCEMENT LEARNING WITH EXPERT FEEDBACK

(71) Applicant: Techolution Consulting LLC, New York, NY (US)

(72) Inventor: Luv Tulsidas, New York, NY (US)

(73) Assignee: Techolution Consulting LLC, New York, NY (US)

( * ) Notice: Subject to any disclaimer, the term of this patent is extended or adjusted under 35 U.S.C. 154(b) by 491 days.

(21) Appl. No.: 18/372,835

(22) Filed: Sep. 26, 2023

(65) Prior Publication Data

US 2025/0103893 A1 Mar. 27, 2025

(51) Int. Cl.
*G06N 3/092* (2023.01)

(52) U.S. Cl.
CPC .................................... *G06N 3/092* (2023.01)

(58) Field of Classification Search
CPC ............................... G06N 20/00; G06N 3/092
See application file for complete search history.

(56) References Cited

U.S. PATENT DOCUMENTS

2020/0257963 A1 * 8/2020 Abhinav ................ G06N 5/045
2024/0290307 A1 * 8/2024 Balassanian ........... G06N 20/00

* cited by examiner

*Primary Examiner* — Kenneth B Lee, Jr.
(74) *Attorney, Agent, or Firm* — Mestechkin Law Group P.C.

(57) ABSTRACT

The present application relates to a process and system for automating Reinforcement Learning with Expert Feedback (RLEF) in AI training processes. The process provides a user-friendly and automated platform (system) that facilitates the training of AI models and enables continuous learning through Reinforcement Learning with Expert Feedback. The process reduces the time and iterations required to build an autonomous grade AI model that performs with high accuracy and consistently when deployed and operating in real world situations. The autonomous AI system integrates a live feedback loop mechanism that combines an AI model, this is referred to as the "apprentice", with instructors who are domain experts at the particular job or tasks that the AI is attempting to automate. This setup allows for the swift training or retraining of the apprentice-level AI system in the field of interest, leading to a rapid continuous improvement of the model towards achieving expert level accuracy where the AI is able to perform the job at the level of the domain expert autonomously. The instructors provide valuable feedback and guidance to the AI model, enabling it to learn and adapt effectively. By leveraging this feedback loop, the AI system can enhance its performance and make more accurate predictions or decisions.

14 Claims, 1 Drawing Sheet

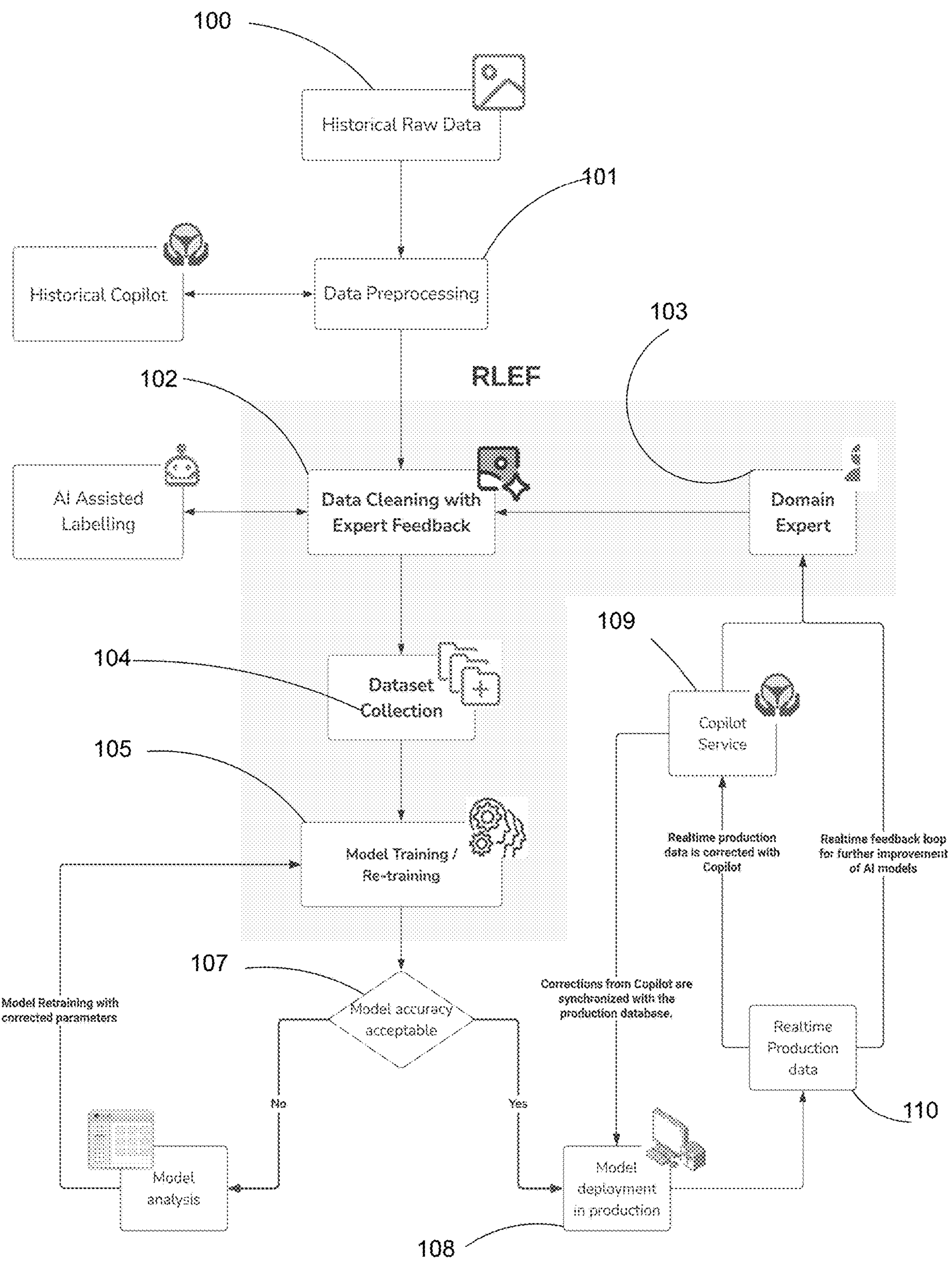
100
Historical Raw Data
101
Historical Copilot
Data Preprocessing
103
RLEF
102
AI Assisted Labelling
Data Cleaning with Expert Feedback
Domain Expert
109
104
Dataset Collection
Copilot Service
105
Model Training / Re-training
Realtime production data is corrected with Copilot
Realtime feedback loop for further improvement of AI models
107
Model Retraining with corrected parameters
Model accuracy acceptable
Corrections from Copilot are synchronized with the production database.
Realtime Production data
No
Yes
110
Model analysis
Model deployment in production
108

AUTONOMOUS AI PROCESS THROUGH REINFORCEMENT LEARNING WITH EXPERT FEEDBACK

TECHNICAL FIELD OF THE INVENTION

The present application relates to the field of artificial intelligence (AI) training and, more specifically, to a process and system for automating Reinforcement Learning with Expert Feedback (RLEF) in AI training processes.

BACKGROUND OF THE INVENTION

Artificial intelligence has emerged as a transformative technology with applications in various industries. Conventional AI training processes/methods are often plagued by challenges such as manual data correction and extensive scripting. These challenges introduce inefficiencies, consume valuable time, and increase the likelihood of errors. Manual data correction involves manually labeling and refining large datasets, which is a labor-intensive and time-consuming task. Additionally, extensive scripting is required to define complex rules and logic for AI models, which can be error-prone and demanding in terms of coding expertise. These challenges not only hinder the training process but also impose significant resource requirements, including manpower and computational resources.

Furthermore, the success of AI models heavily relies on high-quality labeled data. Inaccurate or mislabeled data can significantly impact the performance and usability of AI solutions. Manual data correction and labeling processes are not only laborious but also introduce the potential for human errors and inconsistencies.

In traditional reinforcement learning, an AI agent learns to interact with an environment through trial and error, receiving feedback in the form of rewards or penalties based on its actions. The agent uses this feedback to update its policy and make better decisions over time. However, in complex and dynamic environments, reinforcement learning alone can be time-consuming and result in suboptimal performance.

To overcome these challenges and advance the state of the art in AI training, there is a pressing need for an innovative and streamlined approach to AI training that addresses these challenges and makes the process more efficient, cost-effective, and user-friendly.

The present process provides a solution to one or more of these challenges and represents a game-changer in the AI industry, providing a user-friendly and automated platform that facilitates and significantly accelerates the iterative training of AI models from real world situations and enables continuous learning through Reinforcement Learning only from Expert Feedback in the field the AI is attempting to learn and automate. The platform (system) offers a range of features to streamline the training process, address existing challenges, and generate more accurate and reliable AI models.

SUMMARY OF THE INVENTION

The present application is directed to a novel process and system for automating Reinforcement Learning (RL) with Expert Feedback in AI training processes, offering significant advancements in the field. Reinforcement Learning with Expert Feedback (RLEF) is an approach that combines the principles of reinforcement learning with the expertise and guidance provided by instructors or other AI-based expert systems. It aims to improve the learning efficiency and performance of AI models by leveraging the insights and knowledge of experts in the field.

The proposed process and system improve the efficiency and accuracy of AI models while making the training process more cost-effective. By incorporating instructors as experts, it allows for a seamless transition from apprentice-level AI to independent decision-making, particularly in complex and dynamic real-world scenarios.

In a preferred embodiment, the process for automating Reinforcement Learning with Expert Feedback in AI training processes, includes the steps of: capturing and labeling data using an AI-assisted approval process; pairing AI model (apprentice) with instructors ('domain experts') in an easy and "no-code" manner to rapidly train/retrain the apprentice level AI system by correcting its errors in real time; validating real-time information and dataset approval through a verification module to ensure the utilization of verified and approved data exclusively during the training process; assembling solely verified and approved data in an AI collection module to ensure the model is trained exclusively on reliable data; configuring an API to trigger the training and retraining script of the AI model(s) using the assembled expert-level data; selecting the expert-level data collected in the collection module, utilizing train/retrain controls for further training, retraining, and data analysis; conducting backtesting on the AI model using a dataset not utilized for training, in order to evaluate the validity and performance of the newly trained AI model; utilizing a co-pilot module to identify and rectify errors based on real-time model inferences and input data; accumulating real-time data from the deployed model, eliminating irrelevant and incorrect data/learnings through an automatic workflow process, and generating an AI model for further training; and/or generating a performance and accuracy report of the model based on the accumulated real-time data and feedback provided by instructors acting as experts.

In an another embodiment, the system for automating reinforcement learning with expert feedback in AI training processes, includes a live feedback loop mechanism that pairs AI model (apprentice) with instructors (domain experts), or a combination of both; a user interface facilitating interaction between the human expert instructors and the AI model (apprentice); an AI-assisted approval process with a qualified approver module that accurately labels captured data and properly classifies it; a verification module that validates the approval of real-time information and datasets; an AI collection module that assembles approved data and an API module that triggers the training and retraining of the model using the assembled data.

In another embodiment, the system further includes a backtesting module that assesses the validity and performance of the newly trained AI model; a co-pilot module that identifies and rectifies errors in real-time; and a feedback module that feeds the corrected data back into the approval process.

Additionally, various modifications and alterations to the system and method may be possible without departing from the scope of the invention.

BRIEF DESCRIPTION OF THE DRAWINGS

The foregoing summary, as well as the following detailed description of various embodiments, is better understood when read in conjunction with the drawings provided herein. For the purposes of illustration, the drawings disclose subject matter which is not limited to the specific methods and instrumentalities disclosed. Further, the advantages and features of the present disclosure will be better understood with reference to the following detailed description and claims taken in conjunction with the accompanying drawing, wherein like elements are identified with like symbols, and in which:

FIG. 1 illustrates the block diagram of the autonomous AI process with RLEF.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like.

As used herein, the singular forms "a," "an," and "the" designate both the singular and the plural, unless expressly stated to designate the singular only.

Further, the use of terms "first", "second", and "third", and the like, herein do not denote any order, quantity, or importance, but rather are used to distinguish one element from another.

The present application generally provides a process and system for automating Reinforcement Learning with Expert Feedback (RLEF) in AI training processes. The process provides a user-friendly and automated platform (system) that facilitates the training of AI models and enables continuous learning through Reinforcement Learning with Expert Feedback. The process reduces the time and iterations required to build an autonomous grade AI model that performs with high accuracy and consistently when deployed and operating in real world situations.

The autonomous AI system integrates a live feedback loop mechanism that combines an AI model, this is referred to as the "apprentice", with instructors who are domain experts at the particular job or tasks that the AI is attempting to automate. This setup allows for the swift training or retraining of the apprentice-level AI system in the field of interest, leading to a rapid continuous improvement of the model towards achieving expert level accuracy where the AI is able to perform the job at the level of the domain expert autonomously. The instructors provide valuable feedback and guidance to the AI model, enabling it to learn and adapt effectively. By leveraging this feedback loop, the AI system can enhance its performance and make more accurate predictions or decisions.

The proposed process and system address the limitations and challenges associated with traditional AI training processes.

One of the key advantages of the present process is its ability to significantly reduce the time and iterations required to build an autonomous-grade AI model. With a single click, a high number of training iterations can be performed at a rapid pace using minimal resources. This accelerated training process saves time, increases efficiency, and enables AI models to reach high levels of accuracy faster than traditional methods.

FIG. 1 illustrates the architectural diagram of the present system, which may include the following steps.

Step 101—Data is collected and sent either as bulk data, e.g., from a repository of historical raw data 100 or collected directly from the production pipeline, as shown. The raw data may be processed as discussed herein.

Step 102—Initial data may be cleaned using an AI model, preferably even before any human intervention. In certain embodiments, the data may be cleaned further with expert feedback, as shown at 103. The AI model is preferably trained initially with a small set of curated documents. After this initial training, the AI model may be considered at an "apprentice" level.

Step 103—A domain expert may review the data cleaned by the apprentice or any intermediate level AI model and may correct any errors or inaccuracies in the data cleaned or recleaned by the AI model. In this process, the domain expert may annotate the data according to a classification scheme, either single or multi-tiered and/or hierarchical.

Step 104—The cleaned data may then be grouped into a dataset collection, which may be treated as the ground truth since it has been cleaned and/or annotated by the domain expert.

Step 105—The dataset collection may then be assembled and used to train or retrain the model at Step 106, focusing on improving performance of the model with respect to a given task.

Step 107—If the model's performance does not meet the desired requirements, its accuracy may carefully be debugged to identify underperforming conditions. The model may then be retrained by tweaking its configuration or adding more data, preferably curated data, as shown. If the model meets the required performance standards, it may then be deployed in the production environment at Step 108.

Step 109—During production, any shortcomings of the model may be addressed in real-time by the domain expert using a Copilot feature. that identifies the data set used by the AI model and corrects errors based on real-time inference of the model along with input data.

Step 110—All data processed by the model in the production environment, may be sent back to RLEF.AI for visibility of the model's performance and to aid in further improving its accuracy until it becomes fully autonomous by repeating the steps above until sufficient reliability is reached for the model to retrain itself.

Alternatively, the production data can be corrected in real-time using the Copilot feature so that some of the shortcomings of the initial models may be resolved using expert feedback and reflected in the production application in real time.

The process for automating Reinforcement Learning with Expert Feedback in AI training processes, therefore generally includes the steps of: capturing and labeling data using an AI-assisted approval process, pairing AI model (apprentice) with instructors (domain experts) to rapidly train/retrain the apprentice level AI system by correcting its errors in real time, enhancing model accuracy and ensuring precise data classification; validating real-time information and dataset approval through a verification module to ensure the utilization of verified and approved data exclusively during the training process; assembling solely verified and approved data in an AI collection module to ensure the model is trained exclusively on reliable data; configuring an API to trigger the training and retraining script of the AI model(s) using the assembled expert-level data; selecting the expert-level data collected in the collection module, utilizing train/retrain controls for further training, retraining, and data analysis; conducting backtesting on the AI model using a dataset not utilized for training, in order to evaluate the validity and performance of the newly trained AI model; utilizing a co-pilot live module for real-time correction of AI's decisions, enabling domain experts to supervise and rectify incorrect decisions made by the AI and further allowing these corrections to train the next version of the AI model; utilizing a co-pilot historical module to identify and rectify AI model decisions/inferences and allowing domain experts to visually review the decisions and incorrect inferences made by the AI in the past data set on specific parameters and the subsequent corrections applied; accumulating real-time data from the deployed model, eliminating irrelevant data, and generating an AI model for further training; and/or generating a performance and accuracy report of the model based on the accumulated real-time data and feedback provided by instructors acting as experts, and any one or a combination of the forging steps.

The automated process begins in at least one embodiment with an AI assisted approval process, allowing humans and AI models to label the captured data and the corresponding AI inference. This process ensures that the data is accurate and properly classified, reducing the potential for errors and inaccuracies in the AI model.

Once the data is captured and labeled, the process validates the approval of the real-time information and data set through a verification module. The approved data may then be assembled in an AI collection module, ensuring that only verified and approved data is used in the training process.

The platform triggers an API to train and retrain the model on the assembled and verified data with no coding skills, followed by backtesting the AI model on the data set not used for training (untrained data) to assess the validity and performance of the new trained AI model. This ongoing cyclical process enables the model to learn from its mistakes from experts in the domain providing feedback through an easy to use and no code user interface such that the AI can become more resilient when handling data inputs from real world scenarios.

The process may further include identifying the data set used by the AI model and correcting errors based on real-time inference of the model along with input data using a co-pilot module. This corrected data may then be provided as feedback to the approval process for increasing the performance of the model with ongoing cyclical process of model training.

Furthermore, the process involves no coding/no data science or engineering skills for the human expert to train the user interfaces of AI systems. Through a one-click intuitive user experience or a conversational chat mechanism, the experts can provide corrections/feedback to the apprentice level AI system. The interface is easy to navigate and understand via the one click intuitive user experience, even for non-technical experts. Elements like buttons, sliders, dropdown menus, and checkboxes are designed to be straightforward and self-explanatory. One of the key features is a conversational chat mechanism. The AI system engages in natural language conversations with the human expert, allowing them to provide feedback and corrections in a conversational manner. This chat mechanism could be similar to interacting with a virtual assistant, where the expert can type or speak their inputs.

One significant aspect of the AI platform is their ability to incorporate instructors who are experts in their own fields. This is typically done by assigning the instructors with the appropriate subject matter expertise in the role of pilot, while the AI takes on the role of the apprentice or a co-pilot.

In this system, the instructor, as an expert having a specific skill, is responsible for providing guidance, direction, and feedback to the AI as it learns. The trainer might provide input data, or even specific instructions or rules for the AI to follow. As the AI learns and becomes more capable, it gradually takes on more of the decision-making responsibilities, while the instructor may serve more in a supervisory or oversight role.

The AI model in at least one embodiment generally starts as an "apprentice" in the domain that it is trying to learn. After sufficient rapid expert level coaching/retraining, the AI model learns the expert level skill from the data set training, the instructors or other AI systems and becomes more and more independent, until it attains the level of accuracy which is better than the human expert. This is the point where AI becomes the primary decision-maker or the "pilot". At this point, the instructor as an expert may take on more of a consultative or advisory role (co-pilot), providing guidance and input as needed, but allowing the AI to operate independently. This approach can be particularly useful in situations where the task or environment is complex and dynamic, situations that exist outside of the lab data set it was trained on, and the AI may not be able to fully understand all the nuances and complexities on its own.

The system for automating reinforcement learning with expert feedback in AI training processes, may include a live feedback loop mechanism that pairs instructors as trainers with either human expert instructors or AI-based expert instructors, or a combination of both; a user interface facilitating interaction between the human expert instructors and the AI model (apprentice); an AI-assisted approval process module that accurately labels captured data and properly classifies it; a verification module that validates the approval of real-time information and datasets; an AI collection module that assembles approved data and an API module that triggers the training and retraining of the model using the assembled data;

Backtesting may be an integral part of the process, enabling the evaluation of the trained AI models. It involves testing the models on historical data to assess their performance and effectiveness. Backtesting provides insights into the model's ability to make accurate predictions and decisions in real-world scenarios.

The system may incorporate a co-pilot module that operates in real-time to identify and correct errors. This module works alongside the AI models, actively monitoring their performance and providing immediate feedback and corrections when errors occur. The co-pilot module enhances the model's accuracy and minimizes the impact of errors during deployment.

The real-time data accumulation and processing module includes data analysis and pattern recognition technologies to improve the accuracy of the AI model.

The user interface is a multimodal interface including but not limited to web based, mobile based and voice based interfaces.

The system supports a wide range of data formats including but not limited to text based data, voice based data from audio files, and visual data. It also comprises a data storage including but not limited to data lakes and data warehouses that stores verified and approved data.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

The invention claimed is:

1. A process for automating AI model training processes in an AI system, comprising the steps of:

a) capturing and labeling data, pairing an apprentice level AI model with instructors, and training/retraining the apprentice level AI model by correcting errors in the apprentice AI model in real time;

b) validating real-time information and dataset approval through a verification module to ensure utilization of verified and approved data exclusively during the training process;

c) assembling the verified and approved data in an AI collection module to ensure the apprentice level AI model is trained exclusively on reliable data;

d) configuring an API to trigger training and retraining script of the apprentice level AI model using assembled expert-level data;

e) automating training and retraining script of the apprentice level AI model by domain expert(s) to further rapid on-demand training, retraining, and validation of the apprentice level AI model as it evolves autonomously;

f) selecting the expert-level data collected in the AI collection module, utilizing train/retrain controls for further training, retraining, and data analysis;

g) conducting automated backtesting on the apprentice level AI model using a dataset not utilized for training, in order to evaluate the validity and performance of the newly trained apprentice level AI model;

h) utilizing a co-pilot live module for real-time correction of AI's decisions, therewith enabling domain experts to supervise and rectify incorrect decisions made by the apprentice level AI model;

i) utilizing a co-pilot historical module to identify and rectify AI model decisions/inferences and allowing domain experts to visually review, investigate and analyze the decisions and incorrect inferences made by the AI system in the past data set on specific parameters and the subsequent corrections applied;

j) accumulating real-time data from the deployed model, eliminating irrelevant data, and generating an AI model for further training; and k) generating a performance and accuracy report of the AI model based on the accumulated real-time data and feedback provided by instructors acting as experts.

2. The process of claim 1, comprising using a live feedback loop mechanism that pairs the apprentice level AI model with instructors to rapidly train/retrain the apprentice level AI system by correcting its errors in real time.

3. The process of claim 1, wherein the validation of the data through the verification module includes determining the accuracy and reliability of the data.

4. The process of claim 1, wherein the assembling of only verified and approved data with domain expert level learning in the AI collection module ensures that the model is trained only on a high-quality dataset; thereby increasing the accuracy and performance of the model.

5. The process of claim 1, wherein the triggering of the API to train or retrain the model on the expert level data comprises a single-click iteration process.

6. The process of claim 1, wherein through a one-click intuitive user experience or a conversational chat mechanism, the experts can provide corrections/feedback to the apprentice level AI system.

7. A system for automating reinforcement learning with expert feedback in AI training processes; comprising:

a) a live feedback loop mechanism that pairs AI model with instructors to rapidly train/retrain an apprentice level AI system;

b) a user interface facilitating interaction between human expert trainers and the AI model;

c) a real-time data accumulation and processing module that generates an AI model by filtering out irrelevant data and combining unseen and confused data;

d) an AI-assisted approval process module that accurately labels captured data and classifies it;

e) a verification module that validates the approval of real-time information and datasets;

f) an AI collection module that assembles approved data;

g) an API module that triggers the training and retraining of the model using the assembled data;

h) a backtesting module that automatically assesses the validity and performance of the newly trained AI model by backtesting it on a dataset not used for training, using training and retraining controls, wherein the key metrics of this version of the model is compared to prior versions of the model trained to assess if the accuracy of the model is improving/qualified for production deployment;

i) a click button or algorithmically API call for deploying the trained AI model to production once training has been completed;

j) a plurality of models deployed automatically or on demand to production where a first model runs as the primary decision maker while a second is silently making decisions in production as a background model for comparing its performance with previously deployed and proven model;

k) a plurality of background models deployed to production other than system and hardware limitation where the system is deployed;

l) A co-pilot module that identifies and rectifies errors in real-time; and m) a feedback module that feeds the corrected data back into the approval process, enhancing the model's performance through an ongoing cyclical process of model training.

8. The system of claim 7, wherein any background model can be switched live as the primary model on demand without coding, and any live model can be switched to background model so long that there is at least one model running as the primary decision maker in production.

9. The system of claim 7, wherein the real-time data accumulation and processing module includes data analysis and pattern recognition technologies to improve the accuracy of the AI model.

10. The system of claim 7, wherein the user interface is a multimodal interface comprising at least two of web based, mobile based, and voice based interfaces.

11. The system of claim 7, wherein the system supports a wide range of data formats including but not limited to text based data, voice based data from audio files, and visual data.

12. The system of claim 7, wherein the system further comprises a data storage including but not limited to data lakes and data warehouses that stores verified and approved data.

13. The system of claim 7, wherein the backtesting module allows the users to visually identify, compare and analyze the integrity of the model and allows for detection and correction of faults without the need for coding.

14. The system of claim 7, wherein the co-pilot module includes machine learning algorithms that dynamically identify and rectify errors in real-time by adjusting the training data.

* * * * *